(12) United States Patent
Drewett et al.

(10) Patent No.: US 9,586,367 B2
(45) Date of Patent: Mar. 7, 2017

(54) COMPOSITE LAMINATE THICKNESS COMPENSATION

(75) Inventors: Jeffrey T. Drewett, Kennedale, TX (US); Paul T. Briney, Fort Worth, TX (US); Grady L. White, Fort Worth, TX (US); Gary L. Kelly, Fort Worth, TX (US); Michael L. Hestness, Fort Worth, TX (US); Todd H. Ashton, Fort Worth, TX (US); Peter L. Morken, Rockwall, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 918 days.

(21) Appl. No.: 12/264,757

(22) Filed: Nov. 4, 2008

(65) Prior Publication Data

US 2010/0112190 A1    May 6, 2010

(51) Int. Cl.
*B29C 70/54*    (2006.01)
*B29C 73/10*    (2006.01)

(52) U.S. Cl.
CPC .............. *B29C 70/54* (2013.01); *B29C 73/10* (2013.01); *B29K 2995/0097* (2013.01)

(58) Field of Classification Search
CPC .................. B29C 70/54; B29K 2995/0097
USPC ............................ 427/9; 264/152, 158, 163
See application file for complete search history.

(56) References Cited

U.S. PATENT DOCUMENTS

| | | | |
|---|---|---|---|
| 4,111,557 A * | 9/1978 | Rottenkolber | G01D 5/26 356/394 |
| 4,848,137 A * | 7/1989 | Turner et al. | 73/1.81 |
| 5,000,037 A * | 3/1991 | Baresh | 73/104 |
| 5,341,183 A | 8/1994 | Dorsey-Palmateer | |
| 5,444,505 A | 8/1995 | Dorsey-Palmateer | |
| 5,450,147 A | 9/1995 | Dorsey-Palmateer | |
| 5,506,641 A | 4/1996 | Dorsey-Palmateer | |
| 5,651,600 A | 7/1997 | Dorsey-Palmateer | |
| 5,984,511 A | 11/1999 | Vasey-Glandon et al. | |
| 6,000,801 A | 12/1999 | Dillon et al. | |
| 6,045,651 A | 4/2000 | Kline et al. | |
| 6,547,397 B1 | 4/2003 | Kaufman et al. | |
| 6,843,565 B2 | 1/2005 | Evans et al. | |
| 6,907,651 B1 * | 6/2005 | Fisher et al. | 29/407.05 |
| 7,010,472 B1 | 3/2006 | Vasey-Glandon et al. | |
| 7,241,981 B2 | 7/2007 | Hofmann | |
| 7,268,893 B2 | 9/2007 | Palmateer | |
| 2001/0046323 A1* | 11/2001 | Cork et al. | 382/203 |
| 2003/0052212 A1* | 3/2003 | Anderson et al. | 242/436 |

(Continued)

FOREIGN PATENT DOCUMENTS

WO    2006064287 A1    6/2006
WO    WO 2006064287 A1 *    6/2006

OTHER PUBLICATIONS

Office Action issued by Canadian Patent Office on Jun. 14, 2016 in corresponding Canadian application.

*Primary Examiner* — Alexander Weddle
(74) *Attorney, Agent, or Firm* — Bracewell LLP; James E. Bradley; Brad Y. Chin (57) ABSTRACT

A method is provided for the non-contact measurement of variations in thickness of composite materials and structures prepared from composite parts. Metrologic methods are employed to provide a 3D image of the structure or part. Variations that are greater than an acceptable amount can be corrected by adding a compensation layer to the surface of the structure or part.

20 Claims, 9 Drawing Sheets

(56) References Cited

U.S. PATENT DOCUMENTS

2003/0090025 A1* 5/2003 Nelson et al. ............... 264/162
2004/0039465 A1 2/2004 Boyer et al.
2004/0217497 A1* 11/2004 Engwall et al. ............ 264/40.1
2005/0082262 A1* 4/2005 Rueb et al. ................ 219/121.6
2006/0191622 A1 8/2006 Ritter et al.
2008/0164376 A1* 7/2008 Kato et al. ................... 244/132

* cited by examiner

COMPOSITE LAMINATE THICKNESS COMPENSATION

BACKGROUND OF THE INVENTION

Field of the Invention

The present invention relates generally to methods for measuring the thickness of articles prepared from composite materials, and methods for correcting variations in thickness.

Description of Related Art

Airplane manufacturers are under increasing pressure to produce aircraft that are lightweight, strong, and durable at the lowest possible manufacturing cost and lifecycle maintenance. Airplanes and helicopters must have sufficient structural strength to withstand stresses during flight, while at the same time being as light as possible to maximize aircraft performance. To address these concerns, aircraft manufacturers have increasingly turned to composite materials. These composite materials, such as for example, fiber-reinforced resin matrix composites, provide improved strength, fatigue resistance, stiffness, and strength-to-weight ratio by incorporating carbon fibers into a softer, more ductile resin matrix.

Composite materials typically make up a major portion of military aircraft today, frequently making up 40% or more in terms of the structural mass, and typically covering 80% or more of the aircraft surfaces. The processing conditions and the installation of the composite material panels or skins onto a frame may result in variations in the thickness of adjoining parts. Additionally, during general preparation of composite material panels using traditional lay-up mandrel procedures, variations in the thickness of the parts may also occur. Manufacturers seek to minimize the variation between adjoining parts, particularly in critical areas, such as, on the wings of the aircraft.

Prior art methods for correcting variations in the thickness of adjoining skins typically involved the application of sacrificial plies of a composite part, for example, a composite prepreg tape material across the joint between adjoining parts. Post cure machining of the sacrificial plies by either grinding or sanding is frequently required to reduce the thickness to predetermined thickness threshold requirements for specific parts. However, the extent of machining necessary typically cannot be determined until final assembly of the aircraft. Additionally, the precision milling machines required for the post cure machining are typically very expensive and substantial time is required for the machining process. Furthermore, prior art methods for correcting for variations in thickness of the parts are often less precise. Thus, methods are needed for accurate identification of thickness variations and methods correction thereof.

SUMMARY OF THE INVENTION

The present invention relates to non-contact methods for the measurement of the thickness variations of articles manufactured from composite materials and to methods for correcting thickness variation of adjoining composite material surfaces to ensure the thickness variation of the article is maintained within a predetermined range.

In one aspect, a method for identifying and correcting for variations in thickness in a composite article is provided. The method includes the steps of: (a) providing a composite article; (b) measuring the profiles of the composite article and its forming tool by non-contact means to generate a calculated thickness data set for the composite article; (c) analyzing the calculated thickness data set for the composite article and determining if a thickness variation of the composite article is within a predetermined range; and (d) correcting for a variation in the calculated thickness of the composite article that is outside of a predetermined acceptable thickness variation by applying at least one thickness compensation layer to the composite article, wherein the size of the compensation layer is determined based upon the variation of the thickness of the composite article.

In one embodiment, the method further includes wherein the step of analyzing the calculated thickness data set for the composite article further includes comparing the calculated thickness data set for the composite article against a nominal thickness data set for the composite article. In another embodiment, the step of correcting for a variation in the calculated thickness further comprises the steps of calculating the thickness variation; calculating the shape and thickness of the compensation layer necessary to reduce the thickness variation of the composite article to within the predetermined acceptable thickness variation; supplying a data set relating the calculated shape and thickness of the compensation layer to an automated broadgoods cutter to produce the compensation layer; and applying the compensation layer to the composite article.

In another aspect, a system for measuring and correcting for a thickness variation in a composite part is provided. The system includes means for calculating the thickness of composite article; means for comparing a calculated thickness of the composite article with a nominal thickness of the composite article to produce a thickness variation data set; means for producing a compensation layer to correct for the variations between the calculated thickness of the composite article and the nominal thickness of the composite article; and means for indicating the placement of the compensation layer on the composite article.

In another aspect, a system for calculating and correcting for a thickness variation in a composite article is provided. The system includes a non-contact metrological device; a broadgoods cutting machine; a light source for indicating placement of a compensation layer on the composite article; and a computer in communication with the non-contact metrological measurement device, the broadgoods cutting machine and the light source, said computer being operable to coordinatively control the measurement device, cutting machine and light source.

BRIEF DESCRIPTION OF THE DRAWINGS

FIGS. 5A and 5B are views of illustrating the application of a compensation layer and FIG. 5C illustrates the effect of providing the compensation layer in accordance with another embodiment of the invention.

DETAILED DESCRIPTION

Although the following detailed description contains many specific details for purposes of illustration, one of ordinary skill in the art will appreciate that many variations and alterations to the following details are within the scope and spirit of the invention. Accordingly, any exemplary embodiments of the invention described herein are set forth without any loss of generality to, and without imposing limitations thereon, the present invention.

In general, the present invention relates to non-contact metrologic methods for measuring composite parts that are assembled into articles, such as for example, aircraft wings. Composite materials are used in the manufacture of airplanes, as composite materials provide both reduced weight and added strength. In addition, composite materials are advantageous because parts having irregular shapes can be readily prepared from these materials However, due to processing conditions and the installation of the composite parts and skins onto a frame, variations in the thickness of individual parts, and across adjoining parts frequently occur. Thus, when multiple parts or skins are used to prepare a single large part, such as an aircraft wing, variations in thickness in critical areas of the part or skin can result in steps, or elevation differences, between the part or skin and an adjoining part or skin.

Variations in the thickness of the aircraft skins or panels prepared from composite materials can result in overall thickness variations across the resulting structure of up to ±10%. This thickness variation can be the result of a variety of factors, including variability in the resin content and fiber weight in the manufacture of prepreg tapes, and processing variables related to the manufacture of laminates prepared from the prepreg tapes. Manufacturing standards generally allow for a certain thickness variation or a difference between in the height of adjoining parts, based on predetermined calculations or measurements. When the thickness variation or height difference exceeds a predetermined value, correction may be required.

As used herein, the term "preimpregnated material", or "prepreg", can be a combination of mat, fabric, non-woven material, and the like, and a matrix resin material, the combination of which is ready for molding, and is well known in the art.

As used herein, the terms "metrology" and "metrological" refer to the field of obtaining reliable measurements by methods that typically incorporate laser interferometry, optics and geometry to provide a three-dimensional measurement of an object. Metrological measurements are non-destructive and generally employ non-contact means for determining the position of an object. One exemplary instrument is a coordinate measurement machine (CMM), such as for example, a METRIS laser radar, although it is understood that other non-contact methods for the accurate three-dimensional measurement of objects may similarly be used according the present invention.

Parts prepared from composite materials, particularly aircraft parts and skins, are typically formed using a lay-up mandrel, as is known in the art. Uncured or preimpregnated composite materials are positioned on a lay-up mandrel to form the shape of the desired composite part. The composite material is typically cured on the lay up mandrel. One common cure technique used for the preparation of composite materials, particularly aircraft parts, is known as vacuum bagging, although other techniques for curing the composite materials may also be employed. The uncured part is covered in a vacuum bag, which is then evacuated to compress the composite materials against the lay-up mandrel. Heat, and optionally pressure, are applied to the composite part to cure the materials. The cured parts may then be removed, machined (trimmed) to final size and installed onto an aircraft frame. The pressure created by the evacuated bag compresses the laminate structure, thereby providing good consolidation and interlaminar bonding. The vacuum step removes trapped air and volatiles, thereby reducing the void content of the finished article. In a vacuum bag technique, the vacuum bag provides both the pressure and the vacuum necessary for the cure process.

As used herein, the term "skin" refers to a composite panel or part, which can be attached to the frame of the aircraft to form the outer layer.

As used herein, the term "broadgoods" refers to a family of composite materials generally provided in a roll, as is known in the art. Generally, broadgoods are uncured, preimpregnated sheets that can include fibrous material, glass, carbon fibers and precolimated tapes, and like materials.

The thickness of the individual parts, or of an article comprised of multiple parts or skins (e.g., for an aircraft wing), can be determined by a variety of non-destructive means. The thickness of the part is critical as, in certain embodiments, sufficient material is desired from a standpoint of strength and rigidity of the finished article. At the same time, however, the thickness of the composite article is minimized to reduce the overall weight of the finished article. Variations in thickness across a part and across the finished article are minimized as well, for a variety of reasons, including improved aerodynamics and a reduced radar signal due to the elimination or reduction of edges.

A variety of instruments can be used for non-destructive dimensional measurements of articles prepared from composite materials. A coordinate measuring machine (CMM), such as a laser radar, is one such example. Laser radar provides automated three-dimensional coordinate measurements of large objects. Laser beams are projected against the surface of a part and up to thousands of points of data can then be obtained from the reflected light to provide coordinate data, which can be assembled into a three-dimensional image of the object being scanned. In certain commercially available laser radar instruments, measurements can be taken for objects having a radius of up to 60 meters. A variety of mirrors can be used to expand the line-of-sight both around and behind the object being measured. Furthermore, the laser radar is capable of rapid data acquisition, and in certain embodiments is capable of taking up to 1000 data collection points/sec. The laser may be a wavelength based upon the finished composite article. In certain embodiments, the laser radar operates at an infrared wavelength that is just outside of the visible spectrum. This allows the laser to see through anything that is transparent or translucent, such as for example, the vacuum bags for vacuum curing of the composite materials.

Prior art methods for the thickness measurements include the use of micrometers, which, while being able to provide accurate measurements, is a contact method and is considerably slower than the present methods.

The metrological device provides a data set corresponding to the measured three-dimensional shape of the article being measured. Analysis of the measured data with a computer can identify areas of a skin or part that have a thickness variation or total thickness that is outside of an accepted range or value for a specific area on the part. The size, shape and thickness of one or more suitable thickness compensation layers that are operable to provide an acceptable thickness or thickness variation can be calculated based upon the CMM measurements, and transmitted to a computer which is coupled to a broadgoods cutter for preparation of the compensation layers. In certain embodiments, the data provided by the CMM can be compared against a nominal or ideal data set for the specific part. Each compensation layer can be cut to the exact dimensions determined from calculations based upon the composite article measurements, to correct for the thickness variation or difference in height between adjoining skins or parts that exceed the manufacturers predetermined tolerances. Additionally, the use of compensation layers, according to the present invention, eliminates the need for post application machining.

The metrology instrument is preferably coupled to a central processing unit (CPU), which is operable to receive and process the measured positional data generated for the composite article by the laser radar. The CPU can be any device capable of controlling and programming the metrology instrument, having sufficient memory to store the measured data, such as for example, a computer having software allowing the user to control and process data received from the metrology instrumentation.

In one embodiment, laser radar may be used to measure critical mating surfaces of the panels or skins of the aircraft wings, including along the wing edges and fuel boundary areas. In general, the laser takes at least one measurement per inch of the area of the part being scanned. Preferably, the laser takes at least two measurements per half-inch of the area of the part being scanned. In certain embodiments, the laser acquires three data points in the x-direction and three data points in the y-direction per square inch of the part that is examined. In other embodiments, the laser may acquire about five measurements per two inch interval. When multiple measurements are performed, the measurements may be averaged to provide an average value. It is understood that as more data points are acquired, accuracy of the measurement is increased, however, it is still desired to minimize the number of data points that are acquired to provide for the rapid measurement of the part. Additionally, it is understood that the automated program and analysis portion of the present invention can be configured to identify measurement values that fall outside the range of the other values, and to determine whether the individual measurement should be discarded or if additional measurements at that location are required.

It is understood that the laser device can be mounted to a variety of means that allow the laser to be moved around the object that is being scanned. For example, the laser may be coupled to an arm that is configured to translate in the x-, y- and z-directions, relative to the part be measured. Alternately, the laser may be coupled to a robotic wheeled device. In certain preferred embodiments, the laser may include a GPS tracker or like device, thereby allowing for accurate determination of the exact position of the laser, when each individual measurement is made. It is understood that the device to which the laser is coupled or mounted may include additional improvements, thereby allowing for improved movement and/or increased accuracy of the measurements. For example, in certain embodiments, the laser may include means to reduce the vibration of the laser, such as for example, pads or the like that reduce stand vibration. Additionally, it is understood that the laser may be mounted with a tilt adapter, which allows the head to tilt and/or move from side to side while measurements are being acquired.

While it is possible for the entire part to be scanned and an overall thickness variation for the article to be determined, in certain embodiments the measurements may be limited to certain portions or areas of the article being measured. For example, in the case where the object being scanned is a skin for a composite airplane wing, the measurements may, in certain embodiments, be limited to the portion of the skin, e.g., Zones A-L (FIGS. 4A-4D). that correlate to the support structures of the wing.

Figure 1:
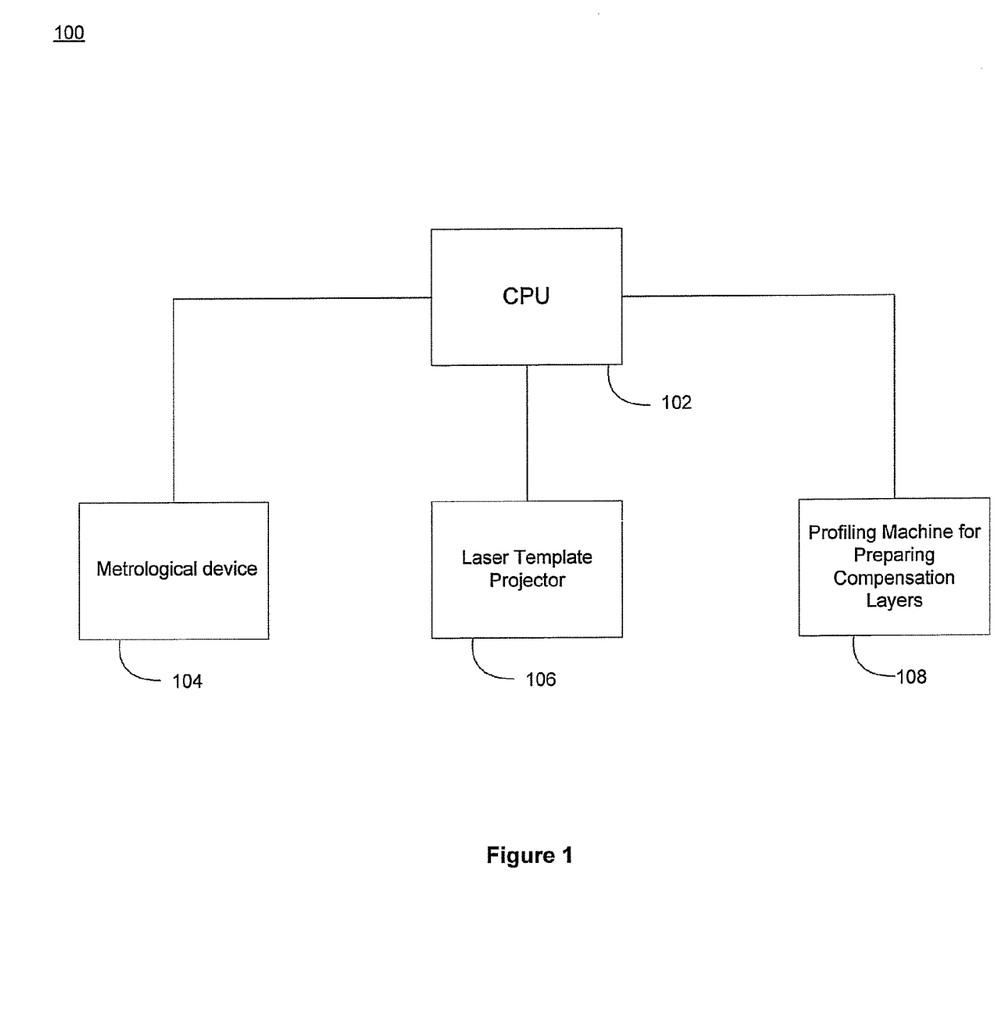
FIG. 1 provides a schematic diagram of an apparatus for determination of thickness variation in composite materials and correction thereof.

As shown in FIG. 1, in one aspect, an apparatus 100 is provided for measuring thickness variations in composite parts or structures composed of composite parts, and for correcting variations in the parts or structures. The apparatus includes a central processing unit (CPU) 102, preferably a computer, configured to interact with the various other components of the system and allowing the user to control the measurement devices. The CPU 102 can be integrated with a metrological device 104, such as a CMM, which is operable to conduct non-contact thickness measurements of the part or structure, and to provide a data set associated with the measurement of the composite article. The CPU 102 analyzes data set received from the metological device 104 to determine if the part or structure has a variation in thickness, which exceeds an allowable amount. The CPU 102 is also operable to calculate the number of compensation layers, and the exact geometry of the compensation layers, that should be applied to the part or structure to reduce the variation in thickness to an acceptable level.

The CPU 102 can also be integrated with a profiling machine 108 for the preparation of compensation plies. The profiling machine 108 can be a broadgoods cutter that is configured to prepare and cut the compensation material to a desired size, based upon calculations. The CPU 102 can be integrated with a laser that includes a projector, pointer 106 or like device, which is designed to visually indicate, on the surface of the part, the location to which the compensation plies should be applied on the composite part or structure to correct for the variations in thickness. The laser device 106 provides a laser in the visible region of the spectrum, thereby allowing the user to see the precise location on the composite article where the compensation layer is to be positioned.

Figure 2:
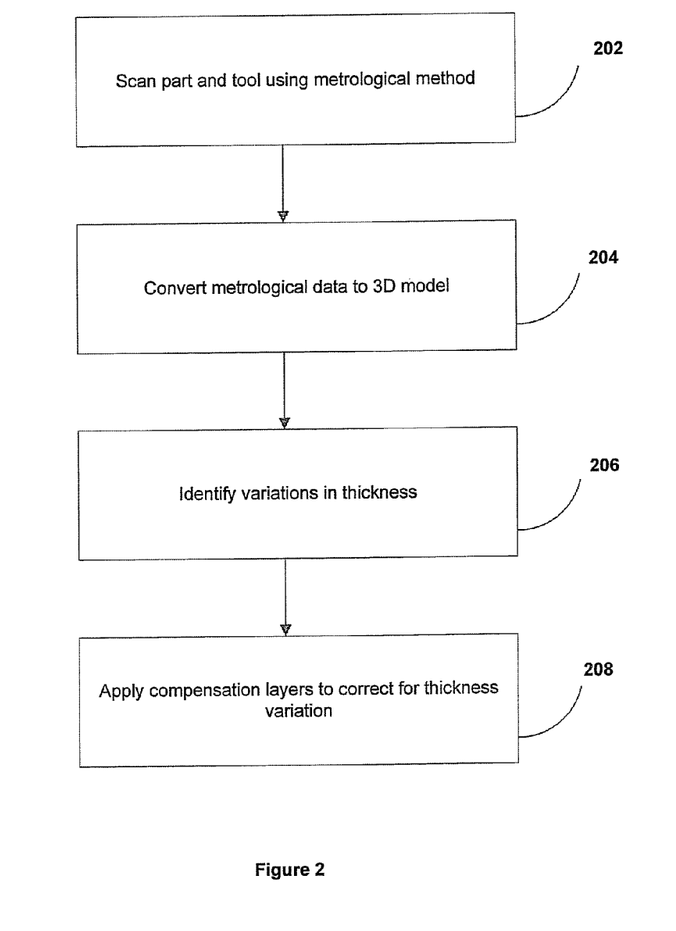
FIG. 2 is a logic flow diagram in accordance with one embodiment of the present invention.

Generally, the process for measuring the thickness of a part, identifying variations in the thickness and correcting for the variations in thickness is provided in the flow chart shown as FIG. 2. In step 202, a composite part and the tool surface used to produce the composite part of are scanned using metrological methods. Preferably, the part is scanned using a laser radar. The laser radar can be used to develop a three-dimensional model of the part being scanned.

In step 204 the metrology data is converted into a three-dimensional model. The data can be sent from the laser to a CPU, which can convert the raw data to the three-dimensional data set. The three-dimensional model data is analyzed, and in step 206 variations in the thickness of the part that exceed a predetermined amount are identified. In step 208, compensation layers can be prepared and applied to the surface of the part to correct for variations in thickness outside of an acceptable range.

In certain embodiments, the metrology data can be compared to CAD data, or can be compared to prior scans of similar parts. Alternatively, the metrology data can be compared to a nominal or ideal data set. Comparison of the data, against either CAD data, a nominal data set, or prior scans of similar parts, can be used in quality assurance applications by comparing the as-built parts with another data set. Furthermore, retaining individual data obtained during the initial scans for each of the as-built parts allows for a database to be compiled, which can be used to provide data that is useful for routine maintenance operations.

Figure 3:
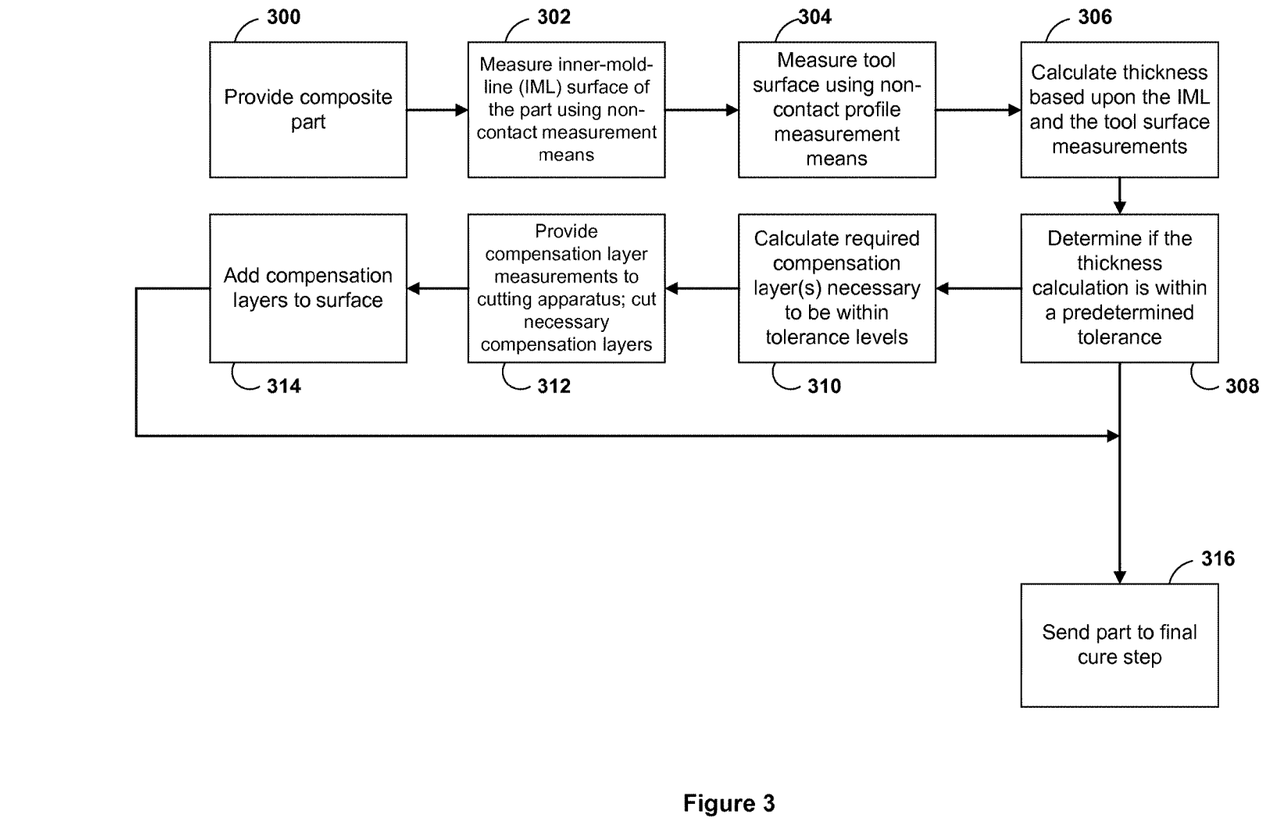
FIG. 3 is a logic flow diagram in accordance with another embodiment of the present invention.
Figure 4A:
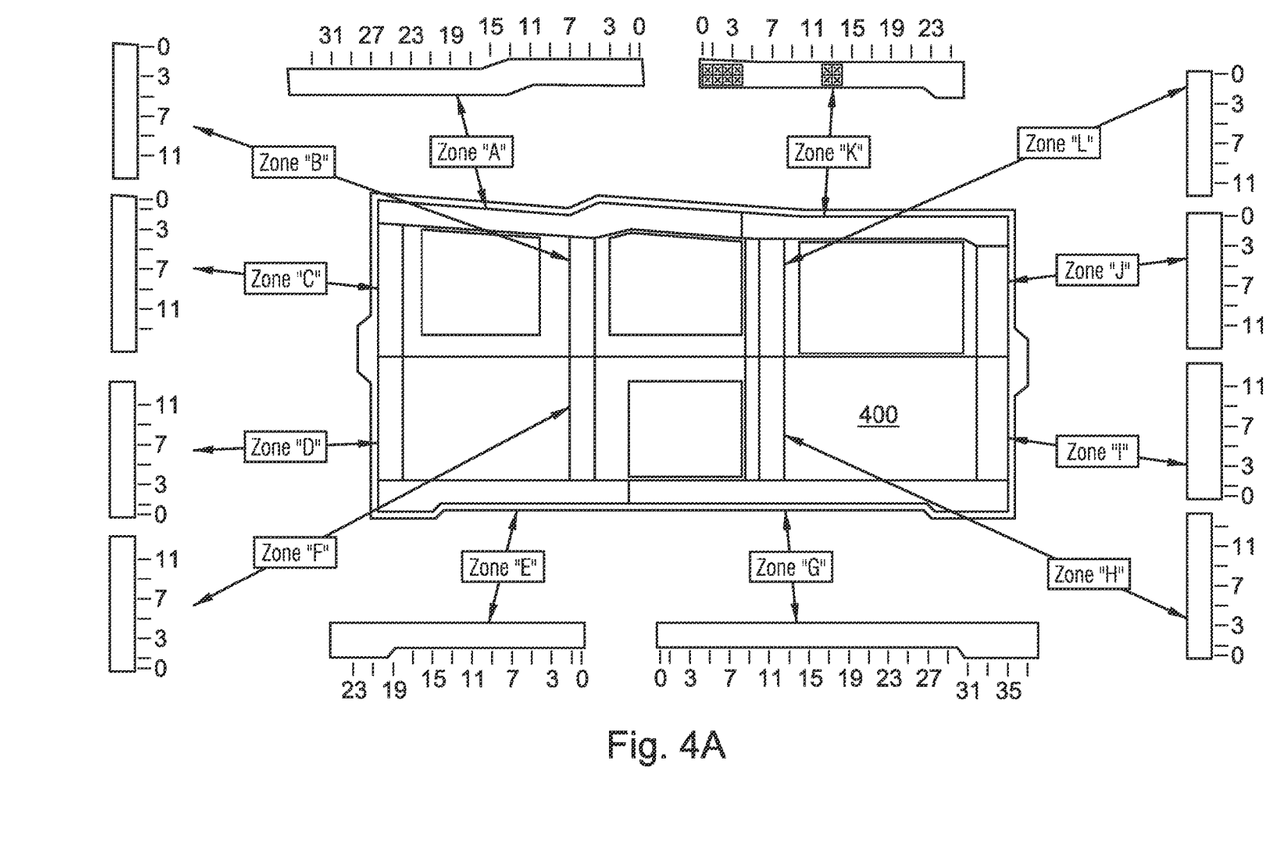
FIGS. 4A, 4B, 4C and 4D are views illustrating sequential application of compensation layers in critical areas (zones) of a composite skin of an aircraft wing in accordance with another embodiment of the present invention.
Figure 4B:
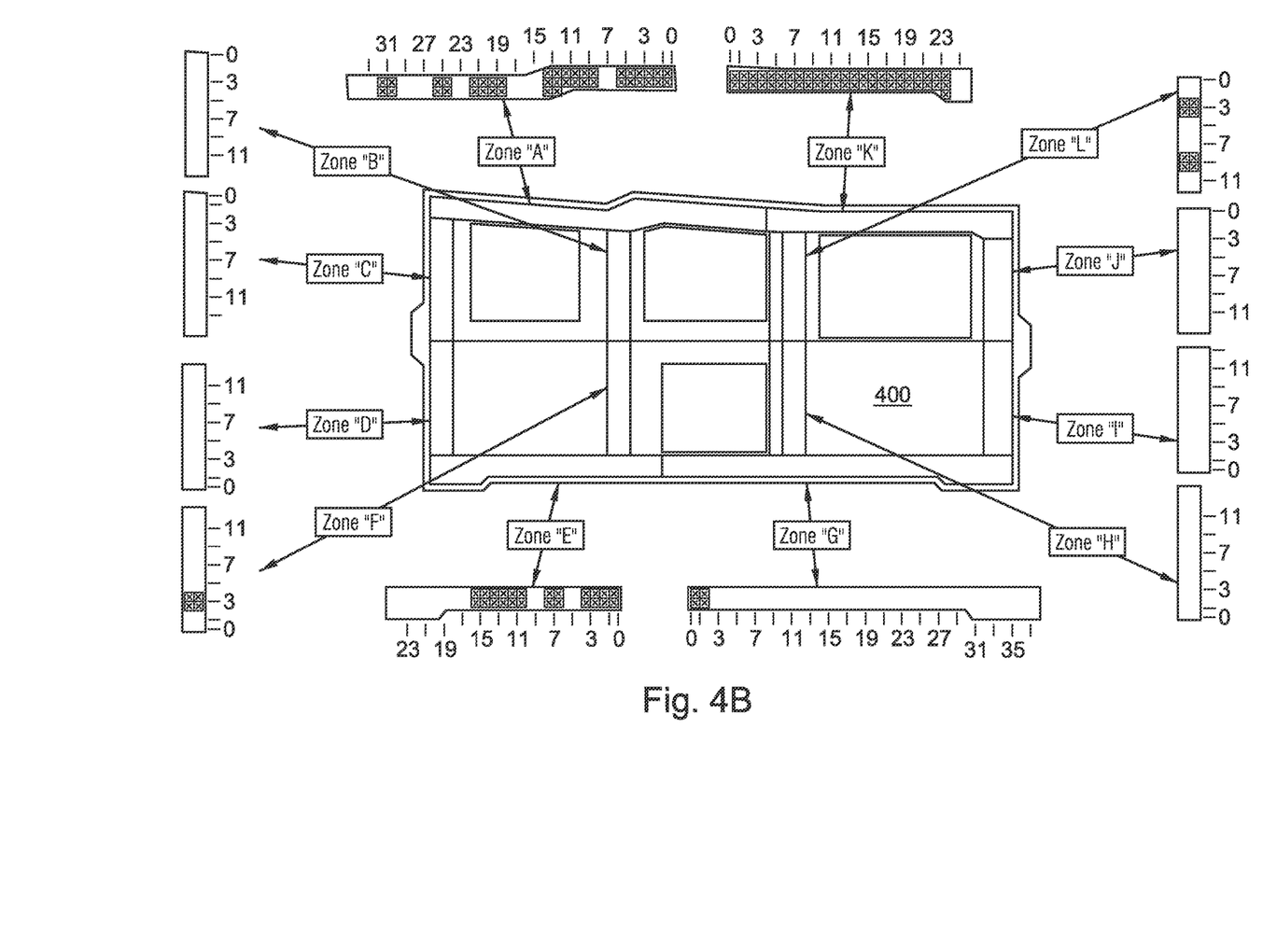
Figure 4C:
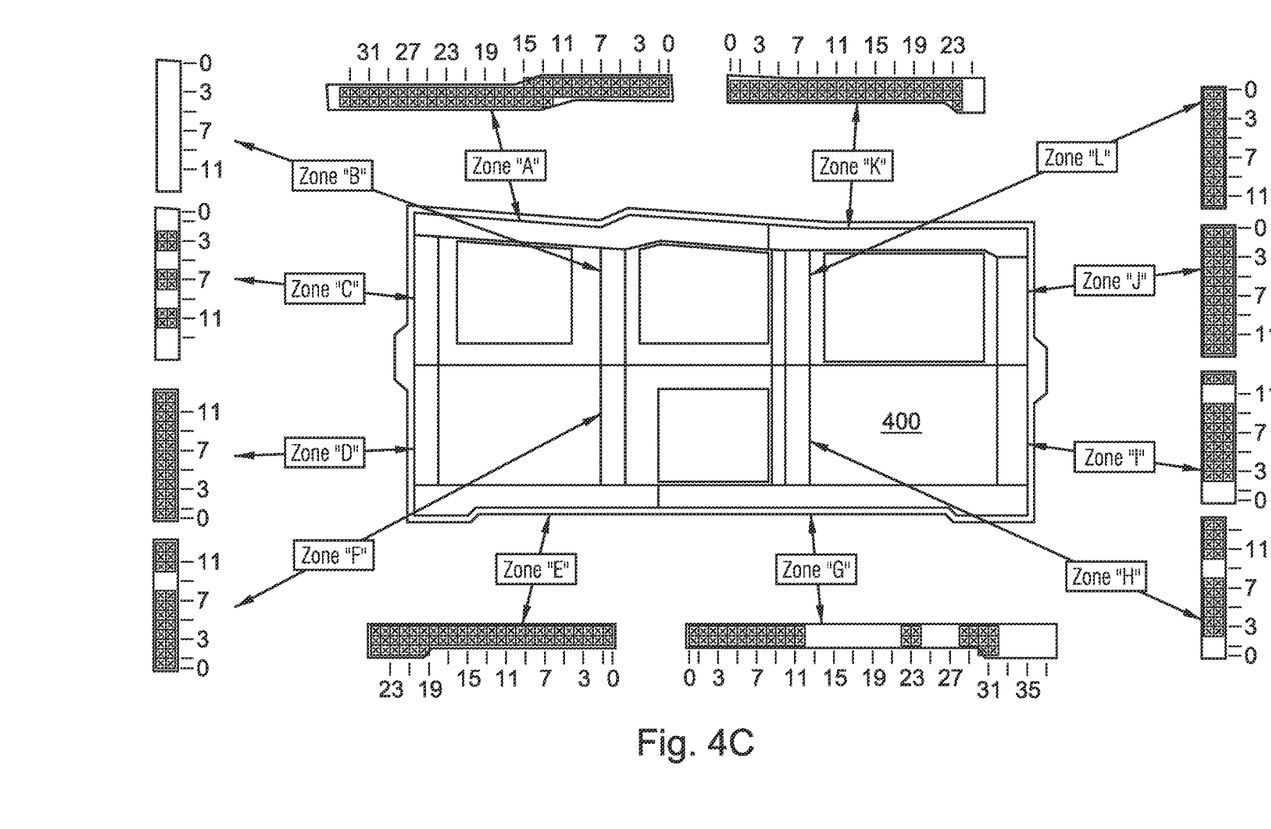
Figure 4D:
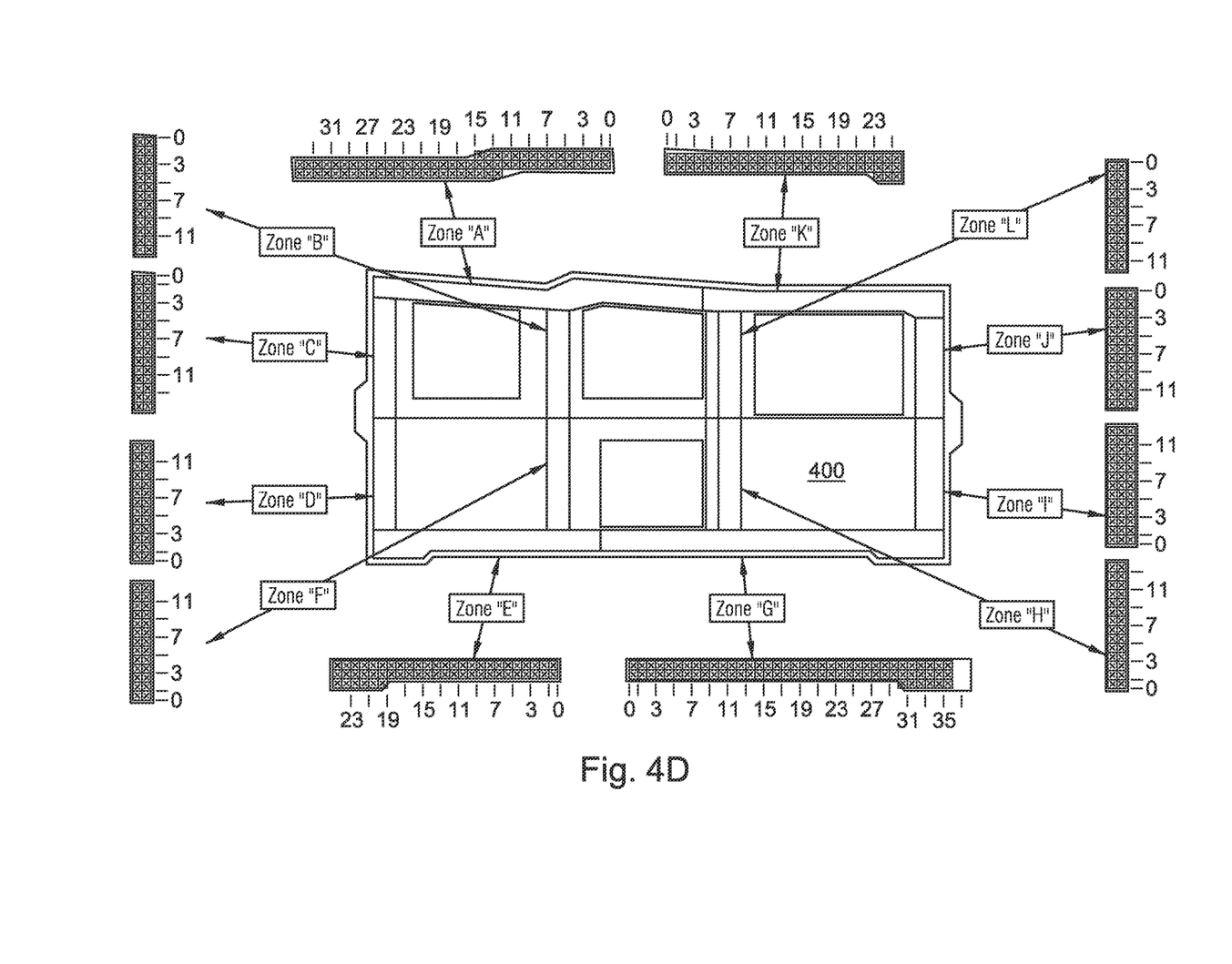

As shown in FIG. 3, a process for the measurement of a thickness variation and the preparation of a compensation layer for application to a composite part or skin for an aircraft wing are provided. In a first step 300, a composite part or skin to be attached to the airframe substructure of an aircraft wing, is provided.

In the second step 302, the profile of the inner-mold-line (IML) of the critical areas of the part or skin are measured using non-contact metrological means. FIGS. 4A-4D, described later, provide an example of the areas on the part or skin 400 of a wing, identified as Zones "A" to "L". Preferably, the profile of the IML of the part or skin is measured using a coherent laser radar. In preferred embodiments, the IML the part or skin is measured at pre-selected points, such as every half inch or every inch, around the perimeter of the part or skin, as well as other identified critical areas, such as where the IML of the part or skin contacts the faying surfaces of the internal support structure of the wing. In certain embodiments, measurements are made over a predetermined area, such as taking measurements every 2 inches, and then averaged to obtain an average thickness of the composite material.

In the third step 304, the surface profile of the tool that the part or skin was formed is measured using a non-contact metrological means, preferably a coherent laser radar. The tool surface measurement closely approximates the profile of the tool molded outer-mold-line (OML) of the part or skin. The tool surface measurements can be used to approximate the OML measurement of the part or skin, and is used instead of direct measurement of the OML of the part or skin.

In the fourth step 306, the thickness of the part or skin is calculated from the IML and tool surface measurements (approximating the OML measurement). Each individual measurement of the IML and its corresponding tool surface measurement is provided to a database and compared to calculate a thickness for the part or skin.

Figure 6:
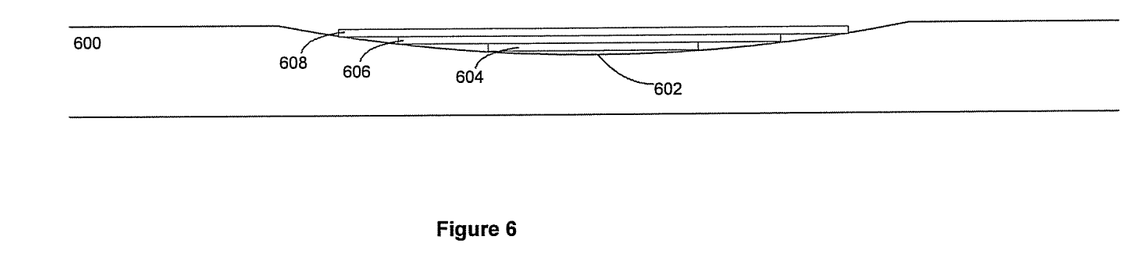
FIG. 6 is a view of the application of a compensation layer in accordance with another embodiment of the invention.

In the fifth step 308, the thickness of the part or skin, as calculated in the fourth step from the IML and the OML measurement, is analyzed to identify any areas of the part or skin having a variation in thickness that is outside a predetermined range, or any low spots (see FIG. 6). These areas typically will require compensation layers to reduce or eliminate the variation in thickness, or to provide a thickness that meets a minimum requirement.

In the sixth step 310, the precise amount of compensation layers required to achieve a desired thickness is calculated.

In the seventh step 312, a data set that includes the calculated size, shape and numbers of compensation layers required to correct for existing thickness variations are provided to an instrument for the preparation of each individual compensation layer. Exemplary instruments for the preparation of individual compensation layers include a broadgoods or pattern cutter. The calculated number of compensation layers required is determined from: the average thickness of the part or skin, the target thickness of the part or skin, and the thickness of each compensation layer. The calculated geometry of each compensation layer is determined and one or more compensation layers are cut from premeasured broadgoods compensation ply material. Preferred compensation materials include woven cloth materials, optionally including glass fibers, carbon fibers, or a like material. In certain embodiments, the compensation material has a non-structured or random orientation of glass or carbon fibers within a woven cloth base. Exemplary broadgoods materials are known in the art. The calculations in the seventh step 312 take into account the thickness of the cured compensation layer. Additionally, waste of the broadgoods material can be minimized as the CPU can provide a preferred use of the broadgoods material to maximize the number of compensation layers that may be cut or prepared from the broadgoods material while at the same time minimizing wasted space.

In the eighth step 314, the compensation layer is added to the composite part or skin. In certain embodiments, the part or skin may be located on the lay-up mandrel surface. A number of techniques have been developed for accurate placement of the material ranging from labor intensive hand layup to automated tape layers. As noted previously, in one embodiment of the present invention, preferably a laser template projector, pointer or like apparatus is coupled to the CPU and an image is then projected onto the part, to visually indicate the precise location on the IML of the part or skin for placement of the compensation layer. Exemplary lasers are known in the art, such as for example, the LPS7 model laser produced and sold by Virtek. The laser can be coupled to the CPU to provide the exact location wherein the compensation layer should be applied to the composite article.

The compensation layer is applied to the IML surface of the composite part or skin, employing any necessary adhesive or compound materials, based upon the compensation ply material. Certain broadgoods materials include a tacky backing and do not require any adhesive or like materials for placement of the compensation layer on the composite article. In certain embodiments, the compensation layer is applied manually. In certain other embodiments, the compensation layer is applied by robotic means. These steps may be repeated, as necessary, until all necessary compensation layers have been applied to the part or skin. FIGS. 4A-4D, described later, illustrate sequential application of compensation layers to any areas of the part or skin having a variation in thickness that is outside a predetermined range, or any low spots.

In a ninth step, the part or skin is then subjected to a secondary cure process in which the part or skin can again be placed within a bag and the bag can be evacuated to remove all moisture and volatile organic compounds. The part or skin is then heated to a predetermined cure temperature. The exact cure temperature is dependent upon the composition of the compensation material. Typically, the part or skin is heated and maintained at a cure temperature of greater than 300° F. In certain embodiments, the part or skin is heated and maintained at a cure temperature of approximately 350° F. Other methods of curing the composite part or skin and the applied compensation layers are known in the art.

In some embodiments, after the compensation layers have been positioned on the part or skin, the thickness measurements of the IML and OML can be taken again, thereby allowing for a determination if any additional compensation layers are necessary. In certain embodiments, after the secondary cure process, the part or skin is again measured to determine if the critical areas are all within a desired thickness relative to adjacent parts or skins.

After a second cure step, the thickness of the wing can optionally be remeasured. In certain embodiments, as a result of the application of the compensation layers to the aircraft part, the thickness variation can be substantially reduced from the initial measured variation. In certain embodiments, the variation in thickness between adjoining skins after the second cure step is less than 5%, preferably less than 4%, less than 3%, less than 2%, more preferably less than 1%, and even more preferably less than 0.5%. Post-cure thickness measurements of the composite article can be used to determine the overall performance of the present invention, as well as determining if the resulting part that includes one or more compensation layers applied thereto have an overall thickness greater than the minimum.

The use of the compensation layers to correct for thickness variations on aircraft parts results in a thickness variation between adjoining skins of less than 0.02 inches, preferably less than 0.01 inches. In certain embodiments, the thickness of adjoining skins is less than 0.007 inches, more preferably to less than 0.005 inches, and even more preferably to less than 0.0035 inches.

As in shown in FIGS. 4A-4D, a predetermined number of measurements are taken on the critical areas of the part or skin 400 at predetermined intervals to identify any areas having substantial variations in thickness. Areas having substantial variation in the thickness are then analyzed to determine what compensation, if any, is required to be added to the critical areas to bring the critical areas within a predetermined range. As shown, multiple areas having significant variation in thickness have been identified, thus requiring the addition of compensation layers. For example, based upon the thickness measurements and subsequent calculations, as shown in FIGS. 4A-4D, portions of Zone K receive the first compensation ply (FIG. 4A), portions of Zones A, E, F, G, K and L receive the second compensation ply (FIG. 4B), all zones except Zone B receive full or partial coverage of the third compensation ply (FIG. 4C) and all zones except Zone G receive full coverage of the fourth compensation ply.

Traditional methods for the assembly of composite materials parts can present numerous challenges. To correct for discontinuity between adjoining surfaces, additional material plies are frequently applied adjacent the junction between the two surfaces.

For certain applications, such as for example, the manufacture of airplane parts, tolerances for a given part or tolerance between adjacent parts, must be determined and corrected when such tolerances are not within a predetermined range. One technique for compensating for discontinuity in a given part, or between adjacent parts, is to apply additional plies (known as "dead" or "sacrificial" plies), followed by machining of the part to achieve the required dimensions. However, this solution has a number of significant disadvantages, including additional cost for the tools necessary to machine the composite materials and the risk of damaging the parts during machining.

Figure 5A:
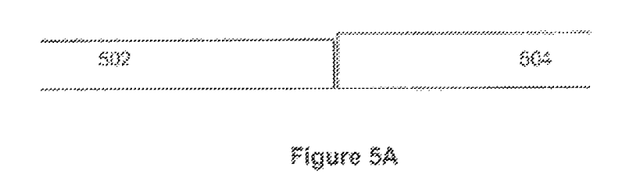
Figure 5B:
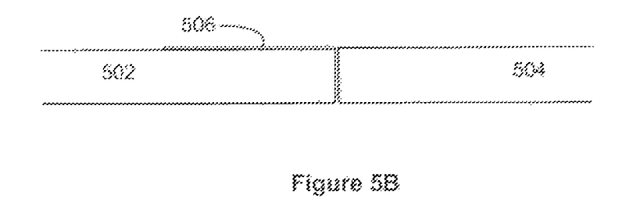

FIGS. 5A-5C illustrate adjacent parts 502 and 504. As shown in FIG. 5A, parts 502 and 504 are provided such that a variation in thickness exists between the two parts, e.g, skins. As shown in FIG. 5B, a compensation layer 506 is applied to skin 502 adjacent a seam that will exist between adjoining skins 502 and 504 when skins 502 and 504 are connected to the faying surfaces of internal support structure 501. The compensation layer 506 will adjust the thickness of part 502, which should eliminate the abrupt edge between the two parts, and bring the variation in thickness to within an acceptable range. FIG. 5C illustrates adjacent parts 502 and 504 connected to the faying surfaces of the internal support structure 501, after the compensation layer 506 has been applied to skin 502.

In certain instances, multiple layers may be added to a specific area. FIG. 6 shows an exemplary part 600 having a low spot 602. Compensation layers can be applied to the low spot, thereby reducing the effect of the low spot, and preferably eliminating the thickness variation entirely. Because the variation of the thickness is known with some certainty, the geometries and the number of the compensation layers necessary to correct for the low spot 602 can be calculated. The calculations can be provided to a broadgoods cutter or like instrument to cut the compensation layer and compensation layers can be prepared. As shown, three compensation layers of increasing size are required to correct the low spot. The first layer 604 is cut and according to measurements provided by metrologic means and calculations performed by a central processing unit (CPU), and is applied to the bottom of the low spot 602. The precise location where the compensation layer is placed is determined by the CPU and illuminated on the article by the laser connected to the metrological means and the CPU. A second compensation layer 606, larger than first layer 604, is similarly prepared and applied to the low spot, on top of the first compensation layer. As shown in the example, a third compensation layer 608 is similarly prepared and applied to the second compensation layer 606. Third compensation 608 is larger than both the first and second compensation layers, 604 and 606 respectively. As shown in FIG. 6, any empty space in the low spot 602 is minimized. Thus, as shown in this example, multiple compensation layers can be applied, and the compensation layers are not required to be the same size.

In certain alternative embodiments, each of the compensation layers (604, 606, and 608) can be positioned in the low spot 602 prior to curing the part 600. In certain other instances, the multiple layers can have different geometries. Preferably, the geometries of the layers are calculated to provide a smooth transition. In certain preferred embodiments, the application of the compensations layers do not result in raised areas.

The methods described herein have multiple advantages. Elimination of the application of multiple sacrificial plies and required subsequent machining of the plies reduces weight and the time to prepare the part (due to the highly labor intensive nature of the machining of the composite materials). Additionally, the methods described herein eliminate the need for the precision machining tool required to machine the sacrificial plies.

The size and shape of the compensation plies can be controlled with the use of automated cutting equipment. A variety of cutting media have been used on these machines including but not limited to: high pressure water, reciprocating knife cutting, and laser cutting, among others.

Furthermore, recitation of the term about and approximately with respect to a range of values should be interpreted to include both the upper and lower end of the recited range.

As used in the specification and claims, the singular form "a", "an" and "the" may include plural references, unless the context clearly dictates the singular form.

Although some embodiments of the present invention have been described in detail, it should be understood that various changes, substitutions, and alterations can be made hereupon without departing from the principle and scope of the invention.

That claimed is:

1. A method for identifying and correcting for variations in thickness in a skin or outer panel designed to be attached to a structural member of a structure, defining a composite article, the method comprising the steps of:
   (a) applying composite layers to a mold surface of a forming tool and while on the mold surface, heating the composite layers to cure the composite layers, thereby providing the composite article configured for attachment to the structural member of the structure, the composite article having an inner mold-line surface that when installed faces the structure, and an outer-mold-line surface opposite the inner mold-line surface, the outer mold-line surface having a surface shape which approximates the mold surface, and which defines an outermost surface of the skin or outer panel and which is on a side opposite from the structural member;

(b) measuring a profile of portions of the inner mold-line surface of the composite article, and a profile of portions of the mold surface of the forming tool using a coherent laser radar to generate a calculated thickness data set for the composite article, the measured profile of the portions of the mold surface approximating corresponding portions of the profile of the outer mold-line surface of the composite article;

(c) analyzing the calculated thickness data set for the composite article and determining if the thickness of any areas of the composite article are not within a predetermined range to thereby identify one or more excursions of the calculated thickness in the any areas when existing, an excursion of calculated thickness being defined as a thickness variation of a portion of the composite article between a calculated thickness of the portion of the composite article and a nominal thickness that is greater than an acceptable amount;

(d) correcting for an excursion of the calculated thickness in areas on the outer mold line of the composite article that are outside of the predetermined range by:
 (i) providing compensation material that has a thickness substantially the same as the respective excursion, and
 (ii) applying the compensation material on an outermost surface of the outer mold line and to the respective area of the composite article having the respective excursion.

2. The method of claim 1, wherein the composite article comprises a first composite article and wherein the excursion comprises a thickness variation between the first composite article and a second composite article that is disposed adjacent the first composite article.

3. The method of claim 1 wherein measuring the profile of portions of the inner mold line surface of the composite article is performed while the composite article is still on the mold surface of the forming tool.

4. The method of claim 1,
 wherein step (d) comprises correcting for an excursion of the calculated thickness in each of the any areas of the inner mold-line surface of the composite article that are outside of the predetermined range; and
 wherein the method further comprises placing portions of the inner mold-line surface of the composite article against the structural member, and securing the composite article to the structural member after the compensation material has been applied.

5. The method of claim 1 wherein the compensation material comprises a plurality compensation layers of known thickness, and wherein the step of correcting for a variation in the calculated thickness further comprises the steps of
 calculating the thickness variation;
 calculating the shape and location of the plurality of compensation layers necessary to reduce the thickness variation of the composite article to within the predetermined acceptable thickness variation;
 supplying a data set relating the calculated shape of the plurality of compensation layers to an automated broadgoods cutter to produce the plurality of compensation layers;
 producing the plurality of compensation layers with the automated broadgoods cutter, the plurality of compensation layers collectively having a shape and thickness necessary to reduce the thickness variation of the composite article to within the predetermined acceptable thickness variation; and
 applying the plurality of compensation layers to the composite article.

6. The method of claim 5 wherein the step of applying the plurality of compensation layers to the composite article includes the steps of:
 supplying a data set relating the shape and location of the plurality of compensation layers to a laser projector to guide in the application of the plurality of compensation layers,
 applying the plurality of compensation layers to the composite article using the laser projector, and
 curing the plurality of compensation layers on the composite article to bond them permanently in place to thereby reduce the thickness variation of the composite article.

7. The method as defined in claim 1, wherein the composite article is a first composite article, wherein the any areas that are outside of the predetermined range comprises a area of the first composite article adjacent a area of a second composite article, wherein the substep of correcting for an excursion of the calculated thickness that are outside of the predetermined range compensates for a thickness variation between the area of the first composite article and the area of the second composite article adjacent thereto, performed without machining the compensation material after the compensation material is applied to the respective area of the composite article having the excursion of the calculated thickness.

8. The method as defined in claim 1,
 wherein the any areas comprises a plurality of areas; and
 wherein each of the plurality of areas having the excursion of calculated thickness covers less than an entire portion of the composite article to thereby define a plurality of discrete excursions.

9. The method as defined in claim 8,
 wherein the excursion results from a recess in the area on a surface of the composite article, the recess having an at least partially concave shape; and
 wherein the compensation material comprises a plurality of compensation layers forming a stack of compensation layers, an initial one of the stacked layers having a smaller size than an adjacent stacked layer stacked upon the initial stacked layer.

10. The method as defined in claim 9, wherein the compensation material comprises a stack of a plurality of compensation layers, and wherein each compensation layer in the stack of compensation layers is sized to match the dimensions of the portion of the recess to which it is being applied.

11. The method as defined in claim 1,
 wherein the structure comprises a aircraft, the structural member being a component of the aircraft;
 wherein the each area of the composite article that are outside of the predetermined range comprises a plurality of areas critical each covering less than an entire portion of the composite article;
 wherein each area of the composite article having a thickness within the predetermined range is not bonded with the compensation material; and
 wherein the method further comprises attaching the composite article to the component of the aircraft.

12. A method for forming a composite skin or panel for a component of an aircraft, comprising the steps of:

(a) applying composite layers to a mold surface;
(b) curing the composite layers while on the mold surface to create a composite skin or panel with an inner mold-line and an outer-mold-line surface;
(c) scanning the inner mold-line surface of the skin or panel and recording data points representative of a profile of the inner mold-line surface of the skin or panel;
(d) scanning and recording data points representative of a profile of the mold surface, the profile of the mold surface approximating the profile of the outer-mold-line surface of the skin or panel;
(e) comparing the data points of step (c) to the data points of step (e) to determine if the skin or panel has one or more areas with a thickness outside of a predetermined range and an amount the respective thickness is outside of the predetermined range;
(f) for each area of the one or more areas of the skin or panel determined to have a thickness outside of a predetermined range:
  (f1) forming a plurality of compensation layers having a combined thickness substantially matching the amount the respective thickness of the respective area is outside of the predetermined range; and
  (f2) co-bonding each of the plurality of compensation layers to the respective area, and on an outer surface of the outer mold-line surface of the skin.

13. The method according to claim 12,
wherein the one or more areas of the skin or panel having a thickness outside of a predetermined range comprises a plurality of areas of the skin or panel having a thickness outside of a predetermined range;
wherein each of the plurality of areas of the skin or panel having a thickness outside of a predetermined range covers less than an entire portion of the skin or panel to thereby define a respective plurality of discrete excursions;
wherein each respective area of the skin or panel determined to have a thickness outside the predetermined range results from a separate one of a plurality of recesses in a surface of the skin or panel at the respective area of the plurality of areas of the skin or panel having a thickness outside the predetermined range;
wherein each plurality of compensation layers of each separate area of the plurality of areas of the skin or panel having a thickness outside the predetermined range comprises forms a stack of compensation layers, each stack of compensation layers positioned within a corresponding different one of the plurality of recesses, each of the stacks of compensation layers comprising an initial one of the stacked compensation layers having a smaller size than a size of an adjacent stacked compensation layer stacked upon the initial stacked layer; and
wherein each of the plurality of compensation layers within each respective stack are sized to match dimensions of a portion of the respective recess receiving the respective compensation layer.

14. The method according to claim 12, wherein the one or more areas of the skin or panel determined to have a thickness outside of a predetermined range comprise a plurality of areas determined to have a thickness outside of a predetermined range, and wherein the method further comprises determining a shape defining a perimeter for each of the plurality of areas having a thickness outside of a predetermined range.

15. The method according to claim 14, wherein step (f) comprises providing perimeters for the plurality of compensation layers to match a shape of at least a portion of the area perimeters of the respective areas.

16. The method according to claim 12, wherein:
step (e) is performed by a processor; and
step (f) comprises supplying instructions from the processor to an automated broadgoods cutter to produce the plurality of compensation layers; and
wherein each of the areas of the skin or panel determined to have a thickness outside the predetermined range are on the inner mold line surface of the skin or panel.

17. The method according to claim 13,
wherein one or more recess of the plurality of recesses comprises a substantially concave shape; and
wherein the plurality of compensation layers of a corresponding one or more stacks of the plurality of stacks of compensation layers are shaped and stacked to collectively match the concave shape of the respective one or more recess.

18. The method according to step 12, wherein step (f2) comprises:
applying each of the respective plurality of compensation layers to each of the respective areas determined to have a thickness outside the predetermined range; and
performing a secondary cure by heating each of the respective the plurality of compensation layers together with the composite skin or panel.

19. A method for forming and attaching a composite skin to a structural member of a wing of an aircraft, comprising the steps of:
(a) applying composite layers to a mold surface;
(b) vacuum bagging and heating the composite layers while on the mold surface to create a composite skin with an inner mold-line surface;
(c) while still on the mold surface, scanning portions of the inner mold-line surface of the skin and recording data points representative of a profile of portions of the inner mold-line surface of the skin;
(d) scanning portions of the mold surface with a coherent laser radar that is offset from the inner mold-line surface and the mold surface, and recording data points representative of a profile of the portions of the mold surface to determine a profile of corresponding portions of an outer-mold-line surface of the skin that is opposite from portions of the inner mold-line surface, the profile of the scanned portions of the mold surface approximating the profile of the corresponding portions of the outer mold line surface of the skin;
(e) with a processor, comparing the data points of step (c) with the data points of step (d) to determine if the skin has one or more areas with a thickness outside of a predetermined range, and also determining a profile for any such areas determined to have a thickness outside of a predetermined range;
(f) for each area of the one or more areas determined to have a thickness outside of a predetermined range:
  (f1) with the processor, providing data to instruct a broadgoods cutter to form a set of one or more compensation layers with a combined thickness that is substantially same as an amount the thickness of the respective area that is outside of the respective predetermined range,
  (f2) providing data to instruct a laser device to provide a visual indication of a location on the outer mold line surface to which each compensation layer of the respective set of one or more compensation layers should be applied, and (f3) co-bonding the respective set of one or more compensation layers to the corresponding area on the outer mold line surface; then (g) connecting the skin to the structural member of the wing of the aircraft.

20. The method according to step 19, wherein the locations to which the respective compensation layers of each set of one or more compensation layers should be applied are along portions of the inner mold line surface of the skin, and wherein sub step (f3) comprises:

applying each compensation layer of each respective set of one or more compensation layers to the corresponding location along a corresponding portion of the inner mold line surface of the skin to which the respective compensation layer should be applied to correct for the respective thickness of the respective area determined to have a thickness outside of a predetermined range;

placing the skin while carrying each respective set of one or more compensation layers applied thereto, in a container for heating; and performing a secondary cure by heating each set of the respective one or more compensation layers together with the panel.

* * * * *